US005595141A

United States Patent [19]
Udelle et al.

[11] Patent Number: 5,595,141
[45] Date of Patent: Jan. 21, 1997

[54] ANIMAL SCRATCHING AND ENTERTAINMENT DEVICE

[76] Inventors: Steven D. Udelle; Laura L. Udelle, both of 13 Seasons Dr.; Jessica J. Udelle, 26414 Barranquilla, all of Punta Gordon, Fla. 33983

[21] Appl. No.: 469,214

[22] Filed: Jun. 6, 1995

[51] Int. Cl.⁶ .................................................. A01K 29/00
[52] U.S. Cl. .......................... 119/706; 119/708; 446/134
[58] Field of Search .................................. 119/702, 703, 119/704, 706, 707, 708; 446/134, 135, 136

[56] References Cited

U.S. PATENT DOCUMENTS 3,874,102  4/1975  Sheppard ................................. 40/106
4,517,922  5/1985  Lind ........................................ 119/29
4,690,657  9/1987  Lodrick .................................. 446/134

*Primary Examiner*—Todd E. Manahan

[57] ABSTRACT

An animal scratching and entertainment device comprises a thin circular ridge 22, a platform 28 covered with carpeting 30, a motor 10, a bar magnet 14 coupled to the motor output shaft 12, a vertical post 35 covered with carpeting 36 connected to a horizontal extension 42, a rigid tether 46 suspended to a lure 48 containing a permanent magnet 50 and a power source 56.

10 Claims, 2 Drawing Sheets

ANIMAL SCRATCHING AND ENTERTAINMENT DEVICE

FIELD OF THE INVENTION

The present invention deals with animal entertainment and claw scratching devices, but more particularly to an animal device that provides continuous motion as a compelling attraction to an animal, whereby an animal will frequent the device on its own initiative more often, thereby improving its physical condition, health, and mental alertness through its own efforts.

BACKGROUND-DISCUSSION OF THE PRIOR ART

Animal toys and amusement devices have a movable object on, around, or within these devices. An animal is usually shown by demonstration the movable object on the device, whereby the animal's inherent instinct to attack, or play with a moving object is imminent. However, these objects have to be initially moved by an animal or a human to begin with, and unfortunately a good device becomes unused for long periods of time and just occupies space. Cats can easily become obese, bored, and listless from lack of frequent entertainment and exercise over a period of time. The prior art more closely associated to the present invention are U.S. Pat. No. 4,690,657, by Lodrick, Sept. 1, 1987, shows a magnetically actuated amusement device requiring the human hand to provide the initial movement of the tethered member. U.S. Pat. No. 4,517,922, by Lind, May 21, 1985, shows a pet amusement device having a flexible spring and a tether attached to a mouse shaped lure whereby an animal or human hand initiates the movement of the tethered toy. U.S. Pat. No. 3,874,102, by Sheppard, Apr. 1, 1975, shows an A/C current magnetic coil attracting a suspended fish causing the pole to bend as the fish is attracted to the electromagnetic coil, thereby causing the fish to spin. When the magnetic fields reach equilibrium, the fish will cease to move. The above prior art devices are dormant when not in use. The prior art does not teach on the use of a motivational means that would exhibit an irresistible incentive or attraction to an animal, whereby the animal would benefit from increased use of the device more often. The present invention takes advantage of the inherent instincts of an animal's response to a moving object, when the original movement of the object is not physically initiated by the animal or human hand, but by the device.

SUMMARY OF THE INVENTION

The present invention utilizes the phenomena of invisible or unseen forces of magnetic fields. In the space around every permanent or electromagnet, there exists a magnetic field. A magnetic field is an example of the physical phenomenon known as a force field, inherent in every electric charge and in the gravitational field around every mass, electromagnet, and permanent magnet. When placing several force fields in close proximity to each other, the unlike force fields will attract and the like force fields will repel. The present invention deals with invisible or unseen force fields and their action and reaction when employing several objects with force fields in close proximity to each other for producing a device that would be useful to an animal. Generally, the preferred embodiment of the present invention comprises an enclosed, bordered surface area resembling a circular arena platform. An electric motor drives a primary permanent bar magnet at a predetermined rotative speed that is concealed within the housing below the arena floor surface for maximum utilization of its inherent magnetic force field. A suspended lure, containing a secondary permanent ceramic disc magnet, is caused to be continuously moving above the arena platform surface by the attracting and repelling of the rotating primary permanent bar magnet attached to the motor output shaft. The gyrating lure quickly prompts a cat into action, trying to capture the bird shaped lure. The cat's attempt to capture and hold the erratic lure can last for extended periods of time. Motor speeds of one to forty rpm effectively move the lure. The best lure action is gained at a motor speed of thirty to thirty five rpm. The vertical post has a claw scratching material throughout its surface. The platform floor covering is useful for claw scratching, paw gripping, and loose animal hair retention. The lure tethering line is enclosed with a rigid, hollow plastic shield to prevent injury between the toes of the animal and possible entanglement with the tethering line. The lure is comprised of a hollow hard plastic for durability. The tethering line is a 100 pound test wire fishing leader fastened to the top overhang and is fastened with a fishing leader swivel for possible lure spinning.

It is therefore an object of the present invention to provide an animal entertainment and claw scratching device that does not require an animal or a human hand to initiate the movement of the lure.

It is another object of the invention to activate the device when the animal is in its most active period two to three times a day for a duration of thirty minutes each.

It is an object of the invention to have an animal expend its surplus energy at scheduled intervals, thereby developing improved muscle tone, alertness, coordination, and better sleeping habits.

It is an object of the invention that upon activation of the device, a cat will always respond to the moving lure.

It is another object of the invention that the animal entertainment and claw scratching stimulator would relieve the animal from boredom by providing amusement, thereby saving areas of household furniture from damage.

Another object of the invention is that an enticement such as catnip, would no longer be required.

Other objects and advantages may be readily determined by the following descriptions.

COMPLETE DESCRIPTION OF THE INVENTION

Figure 1:
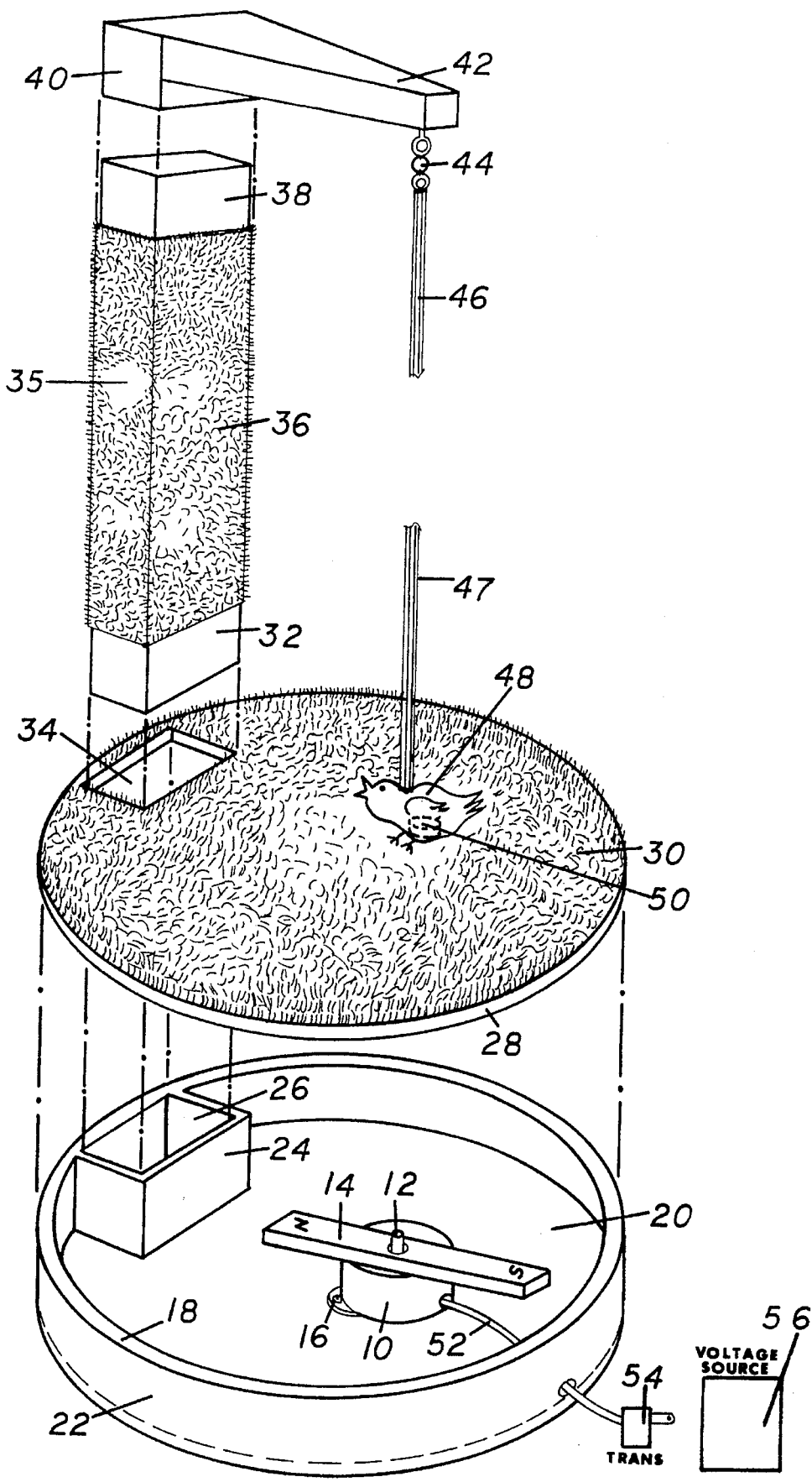
FIG. 1 shows a perspective view of the preferred embodiment of the present invention comprised of a claw scratching post and platform, low voltage motor, bar magnet, lure attached to a tethering line, and voltage source.

FIG. 1 is a perspective view of a preferred embodiment of the present invention comprised of a circular shaped ring 22 serving as a perimeter side enclosure and is affixed to a base portion 20. A rigid circular platform 28 has a carpet material 30 attached to its top surface and is fastened to the top edge 18 of the circular ring 22 housing. The interior of the concealed housing has an electric motor 10, fastened to the base 20 by several screws 16. The electric motor 10 is wired 52 to a transformer or converter 54 and is plugged into a voltage source 56. A primary permanent bar magnet 14 is pressed or coupled at a right angle to the motor output shaft 12. A rectangular receptacle 24 is molded into the side of circular ring housing 22, and the base 20 bottom portion. The opening 26 within the receptacle 24 receives a male rectangular insert 32 of scratching post 35 that passes through an opening 34 of the rigid circular platform 28. The scratching post 35 has an upper male insert 38 which slides into a female opening 40 of the overhang portion 42. A substantial portion of scratching post 35 is carpeted 36. A fishing line swivel 44 is secured below the outer end of overhang portion 42 and is attached to a 100 pound test wire fishing leader 46. The opposite end of the wire leader 46 is secured to a lure-shaped object, such as a bird 48, mouse or ball. The wire leader 46 is housed in a rigid plastic sleeve 47 to protect an animal from injury between its toes, and to eliminate entanglement. The lure 48 is made of rigid plastic for durability and is hollow. A secondary permanent ceramic disc magnet 50 is attached flush within the underside of the lure 48. The completed assembly resembles a raised stage or arena platform wherein the lure is performing bowing, swinging, and spinning gyrations, irresistible to an animal. The bottom of the lure is sufficiently spaced from the carpeted platform surface for producing the most effective movements generated by the revolving primary permanent bar magnet within the device housing. The device can be tipped to its side or upside down with no adverse affects to the motor system or device.

Figure 2:
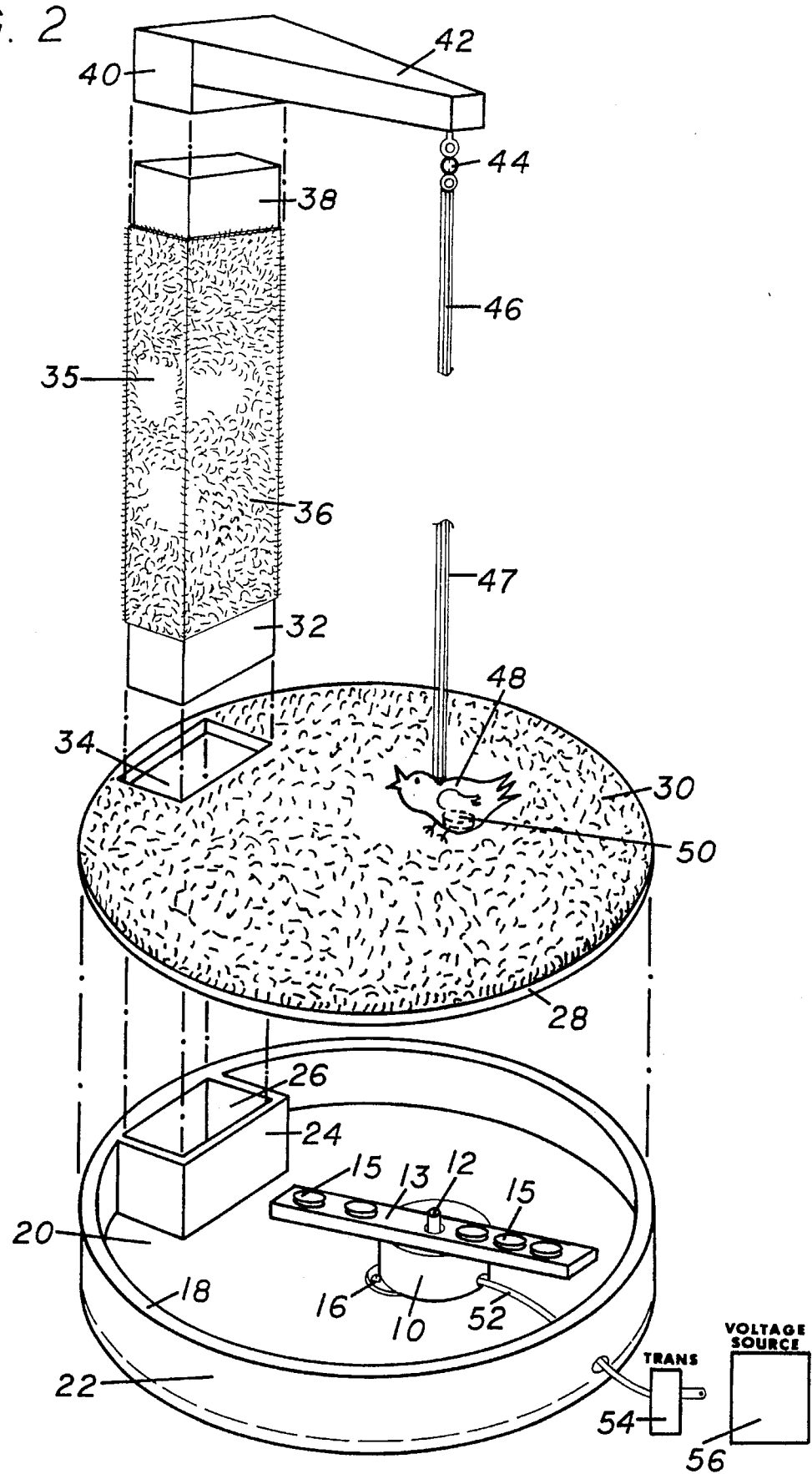
FIG. 2 is an alternate embodiment utilizing a plurality of positioned ceramic disc permanent magnets.

FIG. 2 is a perspective view of an alternate embodiment of the present invention that is identical to FIG. 1, except that an elongated sweep arm 13 is used in place of the primary permanent bar magnet 14 as shown in FIG. 1. FIG. 2 shows a sweep arm 13 pressed or coupled to motor output shaft 12. The upper surface of the sweep arm 13 has a series of primary permanent ceramic disc magnets 15 attached and spaced appropriately. This arrangement allows full attraction or full repulsion effects to take place on the secondary permanent ceramic disc magnet 50 embedded within the lure 48. A varied combination of attraction-repulsion effects are also effectual. These above combinations are effective at output shaft 12 speeds of several to as high as forty revolutions per minute.

CONCLUSION

Thus it has been shown, that the action of the present invention solves the shortcomings of passive devices, past and present, thereby satisfying the consumer's investment with a realistic and more frequently used product. While the above descriptions contain many specific details, these should not be construed as limitations on the scope of the invention, but rather as examples of embodiments or modifications, herein detailed in accordance with the descriptive requirements of law. It should be understood that the details are to be interpreted as illustrative and not in a limiting sense.

We claim:

1. An animal scratching and entertainment device comprising:
   a) a vertical peripheral sidewall forming a base and having a lower surface and an upper surface forming a housing;
   b) said upper surface supporting an elongated vertical member substantially off-center of said upper surface;
   c) said vertical member having an upper end, said upper end supporting a horizontal member extending outwardly to the center of said upper surface;
   d) said horizontal member employs a fastening means to its underside remote from said upper end of said vertical member; and
   e) a rigid tether having an upper end is affixed to said fastening means of said horizontal member;
   f) said rigid tether having an lower end supporting a suspended object; and
   g) a shaft below said upper surface of said housing; and
   h) means for rotating said shaft disposed within said housing; and
   i) means for producing a magnetic field coupled to said shaft and disposed within said housing, wherein rotation of said shaft causes said means for producing a magnetic field to rotate within said housing, the magnetic field produced thereby influencing said suspended object to cause said suspended object to continuously move in an erratic manner above said upper surface of said housing.

2. The device of claim 1, wherein said housing is circular in cross-section.

3. The device of claim 1, wherein said means for rotating said shaft comprises an electric motor.

4. The device of claim 1, wherein said means for producing a magnetic field comprises an elongated arm mounted to said shaft at a right angle therewith, and at least one permanent magnet affixed to said arm.

5. The device of claim 1, wherein said means for producing a magnetic field comprises a permanent magnet in the form of an elongated arm mounted to said shaft at an angle therewith.

6. The device of claim 1, wherein said object is a bird.

7. The device of claim 1, wherein said object is a mouse.

8. The device of claim 1, wherein said suspended object contains an imbedded permanent magnet.

9. The device of claim 1, wherein said upper surface of said housing includes means for permitting an animal to sink its claws therein and thus function as a scratching pad for said animal.

10. The device of claim 1, wherein said vertical member includes means for permitting an animal to stretch its claws thereon and thus function as a scratching pad for said animal.

* * * * *